Mar. 6, 1923.

T. MARTIN

ALARM DEVICE FOR TIRES

Filed Jan. 12, 1922

1,447,595

Inventor Theodor Martin
Attorney G. H. Braddock

Patented Mar. 6, 1923.

1,447,595

UNITED STATES PATENT OFFICE.

THEODOR MARTIN, OF SARATOGA SPRINGS, NEW YORK.

ALARM DEVICE FOR TIRES.

Application filed January 12, 1922. Serial No. 528,684.

*To all whom it may concern:*

Be it known that THEODOR MARTIN, a citizen of the United States, and resident of Saratoga Springs, in the county of Saratoga and State of New York, has invented certain new and useful Improvements in Alarm Devices for Tires, of which the following is a specification.

This invention relates to an alarm device for vehicle tires.

The object of the invention is to provide a simple and novel device adapted to the purpose of giving an alarm to the operator of an automobile when a tire becomes flat.

With the above and other objects in view, the invention comprises the construction, arrangement and combination of parts as now to be fully described and as hereinafter to be specifically claimed, it being understood that the disclosure herein is merely illustrative, slight changes in details of construction and arrangement of parts being permissible so long as within the spirit of the invention and the scope of the appended claim.

In the accompanying drawing forming a part of this specification;

Figures 1, 2, 3, 4:
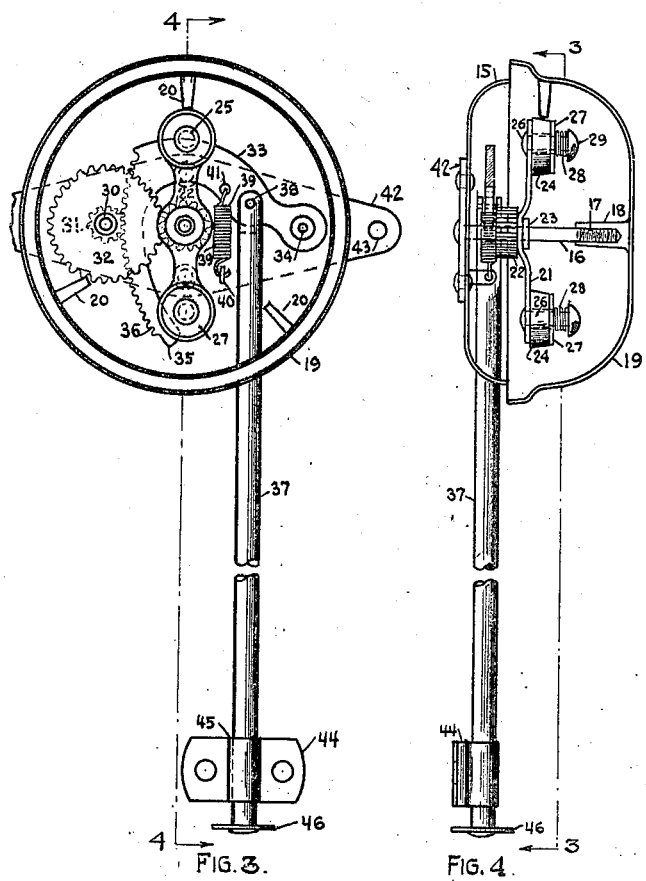
Fig. 1 is an elevational view of the device applied to use as when on an inflated tire.
Fig. 2 is a view corresponding with the showing of Fig. 1 disclosing the device as when the tire is flat.
Fig. 3 is an enlarged sectional view of the device detached, taken on line 3—3 in Fig. 4.
Fig. 4 is a sectional view of the device on line 4—4 in Fig. 3.

In the drawing, 10 denotes the hub of a vehicle wheel, 11 the spokes thereof, 12 the wheel felly, 13 the tire rim, and 14 denotes the tire.

Of the alarm device, 15 represents the frame of a bell having a stud 16 extending upwardly from the center thereof and provided with threads 17 to receive the threaded sleeve 18 arranged centrally of the bell 19. Numeral 20 denotes lugs extending inwardly from the bell. A swivel arm 21 pivoted upon the stud 16 and below the threads thereof carries a gear 22. A collar 23 upon the stud limits the upward movement of the swivel arm. Bell clappers 24 upon the opposite ends of the swivel arm are adapted to engage the lugs 20. The clappers may be associated with the ends of the swivel in any manner. As shown they are provided with enlarged holes 25 receiving pins 26, a washer 27 upon each pin and above each clapper, together with a coil spring 28 having one of its ends resting against the washer and its other end resting against the enlargement 29 of the pin, insuring the working positions of the clappers. Numeral 30 denotes a stud upon the bell frame at a suitable distance from its center and pivotally supporting a small gear 31 arranged adjacent the bell frame and a larger gear 32 above the gear 31 and mounted to turn therewith. Numeral 33 denotes a lever pivoted upon the bell frame at a point 34 opposite the gears 31 and 32 and spaced from the center of the frame, and 35, denotes a segment carried by the lever and having teeth 36 meshing with the gear 31. The gear 32 as shown meshes with the gear 22. A push rod 37 pivoted upon the lever 33 at the point 38 is for the purpose of rotating the lever on its pivot and of causing the teeth of the segment to rotate the gear 31. Numeral 39 denotes a coil spring one end of which is secured to the frame of the bell as at 40 and the other end of which is secured to the lever 33 as at 41. Obviously, the coil spring is for the purpose of returning the lever and its segment to normal position when the push rod is released.

As will be most clear from Figs. 1 and 2, the bell may be secured upon two of the spokes of the wheel as by means of a bracket 42, holes 43 in said bracket being for the reception of nails or screws. Numeral 44 denotes a bracket secured upon the felly of the wheel and provided with a guide way 45 for the push rod 37, and numeral 46 denotes the lower end of the push rod which, as shown, is situated closely adjacent the wheel tire.

The manner in which the alarm device functions is apparent. When the tire is inflated as in Fig. 1 the coil spring acts to hold the lever 33 in its normal position, but when the tire becomes flat the lower end of the push rod is pressed against and the lever is forced upwardly against the action of the coil spring. Evidently, this causes the teeth on the segment to rotate the gears 31 and 32, which latter gear in turn rotates the clappers to cause the same to successively strike the lugs 20.

Having thus fully described the invention, what I claim as new and desire to secure by Letters Patent is:

In combination with a vehicle wheel having a resilient tire, an alarm device secured upon said wheel and adapted to be actuated when the tire becomes flat, the alarm device including a bell frame having a hole, a bracket upon the wheel and adjacent the tire, a pushrod guided in said bracket and hole and having one of its ends adjacent the tire, a lever pivoted within the bell frame and having pivotal connection with the other end of the pushrod, and sound producing means adapted to be actuated by said lever.

Signed at Bridgeport, in the county of Fairfield and State of Connecticut, this 11th day of January, A. D. 1922.

THEODOR MARTIN.